United States Patent [19]

Kober

[11] Patent Number: 4,771,550

[45] Date of Patent: Sep. 20, 1988

[54] MEASURING APPARATUS

[75] Inventor: Hans-Rudolf Kober, Traunreut, Fed. Rep. of Germany

[73] Assignee: Dr. Johannes Heidenhain GmbH, Traunreut, Fed. Rep. of Germany

[21] Appl. No.: 549,232

[22] Filed: Nov. 4, 1983

[30] Foreign Application Priority Data

Nov. 18, 1982 [DE] Fed. Rep. of Germany ....... 3242528

[51] Int. Cl.[4] .............................................. G01B 7/24
[52] U.S. Cl. .................................... 33/573; 33/169 R
[58] Field of Search ........... 33/DIG. 2, 174 R, 174 L, 33/174 TA, 172 R, 172 E, 1 M, 169 R, 567, 568, 569, 573, 503; 269/21; 355/73, 76

[56] References Cited

U.S. PATENT DOCUMENTS

| 3,520,055 | 7/1970 | Jannett | 269/21 X |
| 3,639,990 | 2/1972 | McInnis | 33/18 R |
| 4,099,800 | 7/1978 | Bell et al. | 33/DIG. 2 X |
| 4,414,748 | 11/1983 | Gauler et al. | 33/174 Q |

FOREIGN PATENT DOCUMENTS

| 1082422 | 12/1960 | Fed. Rep. of Germany. |
| 2821360 | 7/1978 | Fed. Rep. of Germany. |
| 7835649 | 4/1979 | Fed. Rep. of Germany. |
| 750950 | 6/1956 | United Kingdom ........... 33/DIG. 2 |

Primary Examiner—Harry N. Haroian
Attorney, Agent, or Firm—Willian Brinks Olds Hofer Gilson & Lione Ltd.

[57] ABSTRACT

A system for removing trapped air layers is disclosed for use in a measuring apparatus such as a length measuring apparatus for measuring dimensions of a test object supported on a measuring surface. According to this invention, the measuring surface defines in the region beneath the resting surface of the test object a plurality of openings which are connected to a source of subatmospheric pressure in order to draw off any trapped air layer present between the measuring surface and the resting surface of the test object. In the illustrated embodiment, these openings are connected with an external suction line by means of channels defined in the measuring table.

15 Claims, 2 Drawing Sheets

MEASURING APPARATUS

BACKGROUND OF THE INVENTION

The present invention relates to improvements to a measuring system such as a length measuring system which is adapted to measure at least one dimension of a test object, wherein the test object defines a resting surface which rests on a measuring surface defined by the measuring system.

A variety of measuring systems of the general type described above are known to the art (German DE-OS No. 28 21 360, German Patent No. DE-PS 10 82 422). Such measuring systems can take the form of coordinate measuring systems or length measuring systems for measuring dimensions, such as the thickness or the external end measure of a test object.

Such measuring systems include a measuring table which defines a measuring surface to support the test object. Difficulties often arise in the exact measurement of the dimensions of the test object with regard to the placement of the test object in a defined, reproduceable position on the measuring table surface. Even when the measuring table surface and the resting surface of the test object are carefully cleaned, measurement differences up to several microns have been observed. One important reason for such measurement inaccuracies is the result of air layers which may be trapped between the very flat contacting surfaces of the measuring table and the test object. In the past, it has been difficult or impossible to remove such air layers, although attempts have been made by applying high forces against the test object, thereby pressing it firmly onto the measuring table surface.

SUMMARY OF THE INVENTION

The present invention is directed to an improved measuring system of the general type described above which substantially eliminates inaccuracies of measurement resulting from trapped air layers between the test object and the measuring surface.

According to this invention, a measuring system of the type described above is provided with means for defining at least one opening in the measuring surface under the resting surface of the test object, and means for connecting the at least one opening to a source of reduced pressure in order to draw off air present between the resting surface and the measuring surface through the at least one opening.

The present invention provides important advantages in that it provides substantial improvements in measuring accuracy in such measuring systems in a particularly simple, low-cost and reliable manner. Further advantageous features of the invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
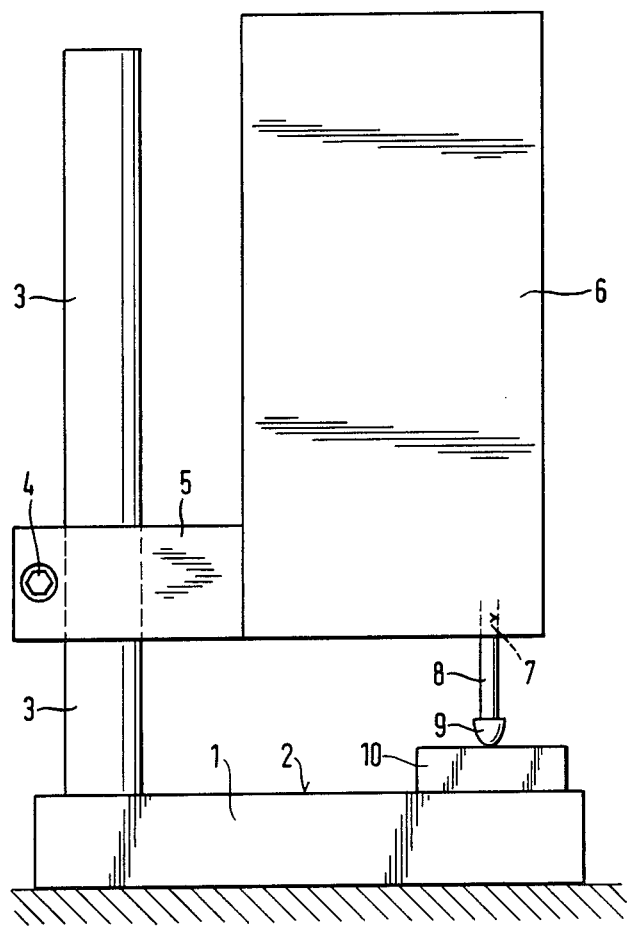
FIG. 1 shows a simplified side view of a length measuring system suitable for use with this invention.

Turning now to the drawings, FIG. 1 shows a simplified side view of a length measuring system which incorporates a first preferred embodiment of this invention. This length measuring system includes a measuring table 1 which defines a horizontal, planar, measuring surface 2. A vertical column 3 is rigidly secured to the measuring table 1, and the vertical column 3 serves to support a horizontal arm 5 which is adjustable in height and is secured to the column 3 by means of a clamping screw 4. The arm 5 serves to support a housing 6. This housing 6 defines an opening 7 through which extends a vertically oriented measuring spindle sleeve 8. The opening 7 is sealed off against environmental influences around the sleeve 8. The lower end of the sleeve 8 defines a changeable measuring sensor 9 which is adapted to come into contact with a test object 10 in order to measure the dimensions of the test object 10. As shown in FIG. 1, the test object 10 rests on the measuring surface 2 of the measuring table 1, directly beneath the measuring sensor 9. Further details of such prior art measuring systems are described in German DE-GM No. 78 35 649.

Figure 2:
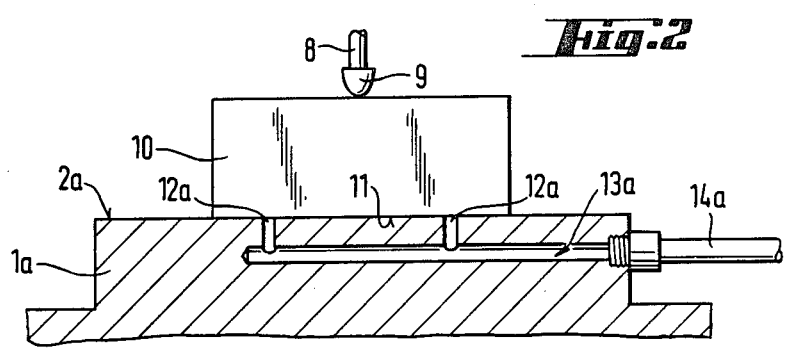
FIG. 2 is a partial cross-sectional view through portions of a measuring system which incorporates a first preferred embodiment of this invention.

FIG. 2 shows a cross-sectional view of the test object 10 resting on a measuring surface 2a of a measuring table 1a. This test object 10 is sensed by the measuring sensor 9 of the measuring spindle sleeve 8. According to this invention, the measuring surface 2a defines beneath the resting surface 11 of the test object 10 two openings 12a, which are connected via a passage 13a in the measuring table 1a with an external suction line 14a. For the elimination of measurement inaccuracies due to trapped air layers, the air layer remaining between the measuring surface 2a and the resting surface 11 of the test object 10 can be drawn off via the openings 12a, the passages 13a, and the suction line 14a as the test object 10 is placed on the measuring surface 2a.

Figure 3:
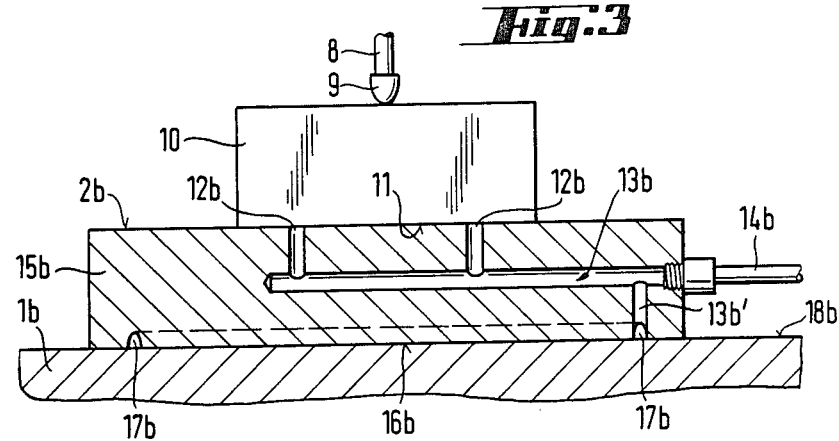
FIG. 3 is a cross-sectional view through portions of a measuring system which incorporates a second preferred embodiment of this invention.
Figure 4:
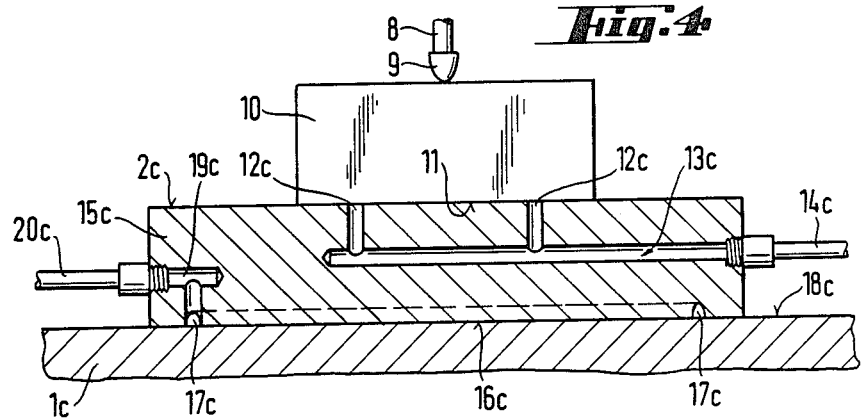
FIG. 4 is a cross-sectional view through portions of a measuring system which incorporates a third preferred embodiment of this invention.
Figure 5:
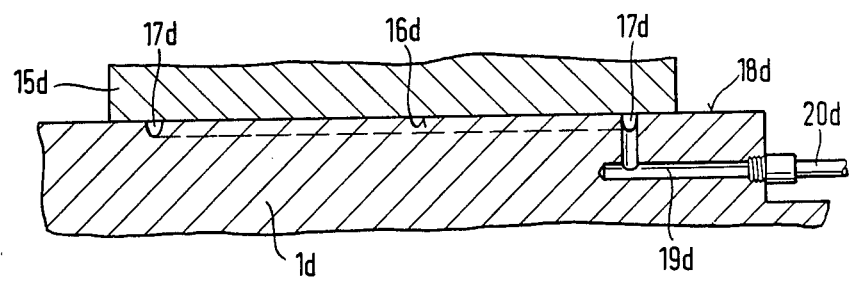
FIG. 5 is a cross-sectional view through portions of a measuring system which incorporates a fourth preferred embodiment of this invention.

FIGS. 3-5 show three alternate embodiments of this invention which utilize an intermediate plate which is interposed between the measuring table and the test object. As shown in FIG. 3, the test object 10 is sensed by the measuring sensor 9 of the measuring spindle sleeve 8. The test object 10 is arranged on a measuring surface 2b which is defined by the upper surface of a planar, parallel intermediate plate 15b. This intermediate plate 15b rests on a measuring table 1b. In order to eliminate measurement inaccuracies related to trapped air layers, the measuring surface 2b defines beneath the resting surface 11 of the test object 10 two openings 12b. These two openings 12b are connected via a passage 13b defined in the intermediate plate 15b with an external suction line 14b. Any trapped air layer remaining between the measuring surface 2b and the resting surface 11 of the test object 10 can be drawn off via the openings 12b, the passages 13b and the suction line 14b as the test object 10 is placed on the measuring surface 2b.

In the embodiment of FIG. 3, the intermediate plate 15b defines a resting surface 16b adjacent the measuring table 1b. This resting surface 16b of the intermediate plate 15b defines openings 17b in the form of an annular groove extending around the marginal region of the intermediate plate 15b. This annular groove 17b is connected via a channel 13b' in the intermediate plate 15b with the passage 13b and the external suction line 14b. Thus, when the suction line 14b (which can, for example be connected to a vacuum pump) acts to draw air out of the passage 13b, it simultaneously draws air via the channel 13b' and the annular groove 17b in order to draw off any trapped air layer between the resting surface 16b of the intermediate plate 15b and the support surface 18b of the measuring table 1b.

Such an intermediate plate 15b provides the important advantage that it can be adapted in a particularly simple fashion with respect to its size, shape and material as well as the position of the openings 12b to accommodate the particular test object 10 under test. Often such an intermediate plate 15b can be adapted to a particular test object 10 more easily than can the measuring table 1b itself.

FIG. 4 shows a third preferred embodiment of this invention. As before, the test object 10 is sensed by the measuring sensor 9 of the measuring spindle sleeve 8. As shown in FIG. 4, the test object 10 rests on a measuring surface 2c which is defined by the upper surface of a planar, parallel intermediate plate 15c which rests on a measuring table 1c. In order to eliminate measuring inaccuracies related to trapped air layers, the measuring surface 2c defines beneath the resting surface 11 of the test object 10 two openings 12c which are connected via a channel 13c in the intermediate plate 15c with an external suction line 14c. When the external suction line 14c is connected to a source of subatmospheric pressure such as a vacuum pump, it draws off any trapped air layer present between the measuring surface 2c and the resting surface 11 of the test object 10.

In the embodiment of FIG. 4, the intermediate plate 15c defines a resting surface 16c adjacent the support surface 18c of the measuring table 1c. In this embodiment, the resting surface 16c defines openngs 17c in the form of an annular groove which extends around the perimeter of the intermediate plate 15c. This annular groove 17c is connected via a channel 19c in the intermediate plate 15c with an external suction line 20c. In a manner similar to that described above, subatmospheric pressure in the suction line 20c acts to draw off any trapped air layer between the resting surface 16c of the intermediate plate 15c and the support surface 18c of the measuring table 1c.

The embodiment of FIG. 4 utilizes two separate suction lines 14c, 20c. This arrangement allows a different level of suction or pressure to be applied between the test object 10 and the intermediate plate 15 on the one hand, and between the intermediate plate 15c and the measuring table 1c on the other hand. Moreover, the suction line 20c can be acted upon when desired with a superatmospheric pressure in order to make it possible to shift the intermediate plate 15c with the attached test object 10 on an air cushion over the measuring table 1c. In this way, the intermediate plate 15c can be shifted in a substantially friction and wear-free manner with the application of low forces into a desired measuring position on the measuring table 1c. After the intermediate plate 15c has been positioned as desired, the line 20c can be disconnected from the source of superatmospheric pressure and connected to a source of suction in order to bring the resting surface 16c of the intermediate plate 15c into intimate contact with the support surface 18c of the measuring table 1c in order to achieve a well defined measuring position for the test object 10.

The embodiment of FIG. 5 differs from that of FIG. 4 only in that the support surface 18d of the measuring table 1d underneath the resting surface 16d of the intermediate plate 15d defines openings 17d in the form of an annular groove. This annular groove 17d is connected via a channel 19d in the measuring table 1d with an external conduit 20d which can be acted upon either with excess, superatmospheric pressure, or with subatmospheric pressure as described above in order to enable the intermediate plate 15d to be shifted easily on the measuring table 1d and to draw off the air layer between the resting surface 16d of the intermediate plate 15d and the support surface 18d of the measuring table 1d.

The preferred embodiments described above provide several openings 12 in the measuring surface 2. However, in principle the invention can also be embodied in systems which utilize only one opening in the measuring surface if the resting surface of the test object is relatively small.

Furthermore, when several openings are provided in the measuring surface it is possible to arrange the openings in the measuring surface in groups such that only selected groups of openings are connected to a source of subatmospheric pressure in correspondence with the configuration of the resting surface of the test object. For example, each group of holes in the measuring surface may be made up of an annularly arranged, concentric row of holes or openings in which each concentric row of holes is connected with a separate, respective suction line. In this embodiment when it is desired to draw off the trapped air layer, suction is preferably applied only to the groups of openings which are entirely under the resting surface of the test object. By way of example, if the embodiment of FIG. 4 were provided with a second group of openings in the measuring surface 2c, this second group could be arranged in a manner similar to that of the openings 17c. In this alternate embodiment, only the central openings 12c would be introduced to suction in the event of a small workpiece, but all openings could be used in the event of a larger workpiece which covered all of the openings in the measuring surface 2c.

Of course, it should be understood that a wide range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a measuring system for measuring at least one dimension of a test object which defines a resting surface, said measuring system comprising a measuring surface adapted to support the resting surface of the test object and a sensing element for measuring the dimension of the test object, the improvement comprising:

means for defining at least one opening in the measuring surface under the resting surface of the test object; and means for connecting the at least one opening to a source of reduced pressure in order to draw off air present between the resting surface and the measuring surface through the at least one opening, thereby increasing measuring accuracy of the measuring system when the sensing element engages the test object to measure the dimension during a measuring operation.

2. The invention of claim 1 wherein the measuring surface is defined by a surface of a measuring table.

3. The invention of claim 1 wherein the measuring surface is defined by a surface of an intermediate plate, and wherein the intermediate plate rests on a measuring table.

4. The invention of claim 2 wherein the connecting means comprises:
a channel formed in the measuring table, said channel having a first end in fluid communication with the at least one opening and a second end; and
an external suction line connected to the second end of the channel to exhaust air from the region between the resting surface and the measuring surface via the at least one opening and the channel.

5. The invention of claim 3 wherein the connecting means comprises:
a channel formed in the intermediate plate, said channel having a first end in fluid communication with the at least one opening and a second end; and
an external suction line connected to the second end of the channel to exhaust air from the region between the resting surface and the measuring surface via the at least one opening and the channel.

6. The invention of claim 3 wherein:
the measuring table defines a support surface;
the intermediate plate defines a resting surface adapted to rest on the support surface; and
the intermediate plate comprises means for defining at least one opening in the resting surface of the intermediate plate to allow air present between the resting surface of the intermediate plate and the support surface of the measuring table to be drawn off.

7. The invention of claim 3 wherein:
the measuring table defines a support surface;
the intermediate plate defines a resting surface adapted to rest on the support surface of the measuring table; and
the measuring table comprises means for defining at least one opening in the support surface of the measuring table under the resting surface of the intermediate piece to allow air present between the resting surface of the intermediate piece and the support surface of the measuring table to be drawn off.

8. The invention of claim 6 wherein the intermediate plate further defines a channel which interconnects the at least one opening in the resting surface of the intermediate plate with the at least one opening in the measuring surface of the intermediate plate.

9. The invention of claim 6 wherein:
the connecting means comprises a first channel formed in the intermediate plate, said first channel having a first end in fluid communication with the at least one opening in the measuring surface of the measuring plate and a second end; and an external suction line connected to the second end of the first channel to exhaust air from the region between the resting surface of the test object and the measuring surface of the intermediate plate via the first channel; and
the intermediate plate further defines a second channel which interconnects the at least one opening in the resting surface of the intermediate plate with the at least one opening in the measuring surface of the intermediate plate.

10. The invention of claim 6 further comprising:
an external conduit; and
a channel defined in the intermediate plate to interconnect the external conduit with the at least one opening in the resting surface of the intermediate plate.

11. The invention of claim 7 further comprising:
an external conduit; and
a channel defined in the measuring table to interconnect the external conduit with the at least one opening in the support surface of the measuring table.

12. The invention of claim 10 further comprising:
means for selectively applying a reduced pressure to the external conduit; and
means for selectively supplying an increased pressure to the external conduit.

13. The invention of claim 11 further comprising:
means for selectively applying a reduced pressure to the external conduit; and
means for selectively supplying an increased pressure to the external conduit.

14. The invention of claim 1 wherein the at least one opening comprises a plurality of groups of openings, and wherein the connecting means operates selectively to connect only selected ones of the groups of openings to the source of reduced pressure in correspondence with the resting surface of the test object.

15. The inventin of claim 1, wherein the dimension comprises a component oriented transverse to the measuring surface such that air present between the resting surface and the measuring surface contributes to measuring error of the dimension, and wherein the sensing element directly contacts the test object to measure the dimension.

* * * * *